United States Patent
Harada et al.

(10) Patent No.: US 6,641,759 B1
(45) Date of Patent: Nov. 4, 2003

(54) POLYMER SECONDARY CELL ELECTRODE PRODUCTION METHOD

(75) Inventors: Gaku Harada, Tokyo (JP); Toshihiko Nishiyama, Tokyo (JP); Masaki Fujiwara, Tokyo (JP); Shinako Kaneko, Tokyo (JP); Masato Kurosaki, Tokyo (JP); Yuuji Nakagawa, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 462 days.

(21) Appl. No.: 09/668,944

(22) Filed: Sep. 22, 2000

(30) Foreign Application Priority Data

Oct. 19, 1999 (JP) ............................................. 11-296903

(51) Int. Cl.$^7$ .......................... B29C 70/60; B29C 70/88
(52) U.S. Cl. ........................ 264/85; 264/105; 264/119; 264/122; 264/123; 264/125; 264/319
(58) Field of Search ........................ 264/85, 104, 105, 264/109, 129, 119, 122, 128, 255, 319; 427/126.1, 214, 216, 220, 221, 355, 58, 77

(56) References Cited

U.S. PATENT DOCUMENTS

| | | | | |
|---|---|---|---|---|
| 4,915,985 A | * | 4/1990 | Maxfield et al. ......... | 427/126.6 |
| 4,940,524 A | * | 7/1990 | Perineau et al. ............ | 204/242 |
| 5,032,475 A | * | 7/1991 | Hasebe et al. ................ | 429/60 |
| 5,098,617 A | * | 3/1992 | Schuster ...................... | 264/450 |
| 5,151,221 A | * | 9/1992 | Osterholm et al. ......... | 252/500 |
| 5,266,177 A | * | 11/1993 | Watanabe et al. ....... | 204/290.11 |
| 5,522,127 A | * | 6/1996 | Ozaki et al. ................ | 29/623.5 |
| 5,698,147 A | * | 12/1997 | Chern et al. ................ | 264/104 |
| 5,731,107 A | * | 3/1998 | Willmann et al. .......... | 429/213 |
| 5,789,111 A | * | 8/1998 | Ozaki et al. ............. | 429/218.1 |
| 6,010,653 A | * | 1/2000 | Menon ....................... | 264/105 |

FOREIGN PATENT DOCUMENTS

| | | |
|---|---|---|
| JP | 61-214418 | 9/1986 |
| JP | 7-130356 | 5/1995 |
| JP | 8-64200 | 3/1996 |

* cited by examiner

*Primary Examiner*—Angela Ortiz
(74) *Attorney, Agent, or Firm*—Choate, Hall & Stewart

(57) ABSTRACT

Powder of a polymer active material 1 exhibiting an electrochemical oxidation-reduction reaction is mixed with powder of a conductivity assisting agent 2 to obtain a mixture. The mixture is molded by a thermal press into a unitary block. Thus, a cell electrode having a large film thickness is produced without causing cracks or breakage. The electrode having a large film thickness improves the energy density of the polymer secondary cell.

16 Claims, 3 Drawing Sheets

POLYMER SECONDARY CELL ELECTRODE PRODUCTION METHOD

BACKGROUND OF THE INVENTION

1. Field of the Invention

The present invention relates to a polymer secondary cell electrode production method and in particular, to a polymer secondary cell electrode production method using a high molecular material exhibiting an electro-chemical oxidation-reduction reaction and an conductivity assisting agent.

2. Description of the Related Art

Recently, the environment and energy problems increase the interest for electric vehicles (EV) or hybrid cars. Conventionally, the most important problem for the electric vehicles and the hybrid cars has been associated with a battery element such as a cell capacitor. The battery element has technical problems of (1) low energy density, (2) low power density, and (3) low cycle characteristic.

In order to solve the problem of the low energy density, it is necessary (1) to increase the cell electromotive force, (2) to increase the capacity of the electrode active material, (3) to improve the cell volumetric efficiency, and the like. The solutions (1) and (2) are very difficult because they require a development of a new active material and a development of an electrolyte having a wide potential window. On the other hand, the solution (3) can be realized by increasing the electrode film thickness to increase the film thickness ratio of the electrode/collector, thus improving the energy density.

According to the conventional electrode production method, an electrode active material, binder, conductivity assisting agent, and solvent are mixed into a slurry, which is applied to a collector using a doctor blade or the like. However, the electrode film thus prepared has a thickness not greater than 200 micrometers and the film thickness ratio of the electrode against the collector is as low as 10. This is because the binder is solved in a solvent and the binder shrinks when dried, which in turn brings shrinkage of the electrode itself. This causes cracks and breakage of the electrode and peeling off of the electrode from the collector. This phenomenon becomes more remarkable as the electrode film thickness becomes thicker. Moreover, if the binder content is increased to prevent cracks of the electrode, there arises a problem that the binder molecules cover the electrode active material, lowering the cell performance.

In order to solve this problem, Japanese Patent Publication 8-64200 [1] discloses an electrode made from a high molecular material exhibiting an electro-chemical oxidation-reduction added by a plasticizer such as phthalic acid. This electrode increases the flexibility by adding the plasticizer to the high molecular material.

Moreover, Japanese Patent Publication 61-214418 [2] discloses an electrode prepared from activated carbon fiber which is formed into a paper shape using a thermal fusion binder medium such as polyethylene and polypropylene and subjected to a thermal press or thermal calendar processing so that the activated carbon fiber and the binder medium are thermally fused.

However, the aforementioned conventional techniques have problems as follows. In the case of the electrode disclosed in document [1], although the plasticizer increases the flexibility of the electrode, since film formation is performed by using the high molecular material exhibiting an electro-chemical oxidation-reduction and the plasticizer dissolved in a solvent, the high molecular material shrinks when dried and cracks are easily caused in the electrode when a thick film electrode is formed even when the plasticizer is added. Accordingly, the electrode film thickness should be limited to a range of 20 to 100 micrometers.

Moreover, in the case of the electrode disclosed in document [2], a high molecular binder such as polyethylene and polypropylene not exhibiting oxidation-reduction is used and the binder molecule covers the electrode active material, lowering the cell performance.

SUMMARY OF THE INVENTION

It is therefore an object of the present invention to provide a polymer secondary cell electrode production method using a polymer active material exhibiting an electro-chemical oxidation-reduction and a conductivity assisting agent which solves the aforementioned conventional technical problems.

The polymer secondary cell electrode production method according to the present invention comprises steps of: mixing a polymer active material powder exhibiting an electro-chemical oxidation-reduction reaction and a conductivity assisting agent powder; and molding the mixture by thermal press into a predetermined thickness.

According to another aspect of the present invention, the polymer secondary cell electrode production method comprises steps of: coating a conductivity assisting agent with a polymer active material exhibiting a electro-chemical oxidation-reduction reaction into a coated powder; and molding the coated powder by a thermal press into a predetermined thickness.

The polymer active material may be selected from a group consisiting of polyaniline, polypyrol, polythiophen, polyacetylene, polyvinyl carbazole, polytriphenylamine, polypyridine, polyopyrimidine, polyquinoxaline, polyphenylquinoxaline, polyisothianaphten, polypyridinezeal, polythienylene, polyparapffinylene, polyfluran, polyacen, polyfuran, polyazulene, polyindol, and polydiaminoantraquinon.

The temperature of the thermal press should be not lower than the glass transition point or the melting temperature of the polymer active material. At this temperature, the polymer active material is made into a rubber state partially or melted. When the polymer active material in this state is pressed, particles of the material adhere to each other or particle and the conductivity assisting agent adhere to each other. Thus, the melted particles adhere to one another and the electrode is molded into a unitary block. When this electrode is cooled, the shrinkage is small because the particles are melted only partially. Accordingly, cracks will not be caused easily when the electrode film is made thick.

By performing the thermal press in a nitrogen gas atmosphere, it is possible to suppress oxidation of the polymer active material, thus enabling to maintain the oxidation-reduction activity of the polymer active material.

The conductivity assisting agent powder may be one or more than one in combination selected from a group consisting of acetylene black, Ketjen black, epitaxial carbon, graphite powder, aniline black, activated carbon powder and other conductive carbon powder, polyacrylonitirile, pitch, cellulose, phenol resin, or sintered carbon powder formed from palm shells, oxide powder of Ti, Sn, or In, metal powder such as stainless steel, Ni, Au, Ag, Ta, Nb, Cu, and Al.

DESCRIPTION OF THE PREFERRED EMBODIMENTS

Figure 1:
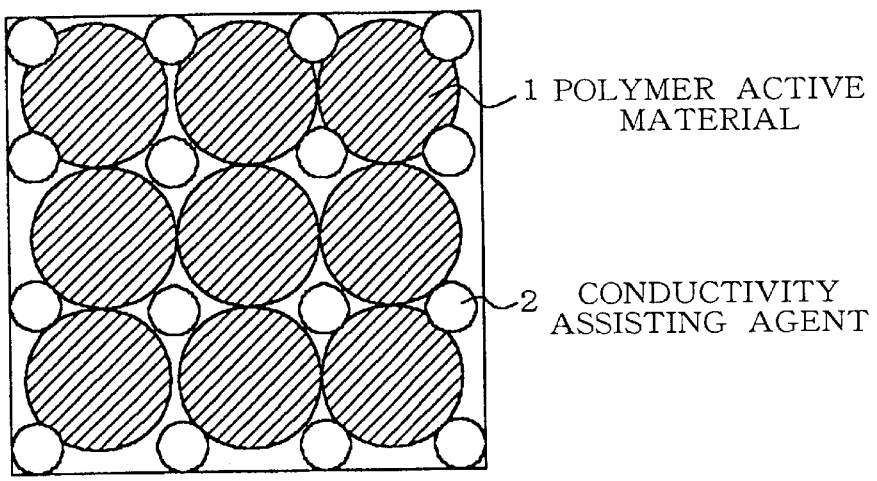
FIG. 1 is a cross sectional view of an essential portion of an electrode for explaining cell electrode production method according to a first embodiment of the present invention.

Description will now be directed to embodiments of the present invention With reference to the attached drawings. FIG. 1 is a cross sectional view of an essential portion of an electrode for explaining a cell electrode production method according to a first embodiment of the present invention. As shown in FIG. 1, power of polymer active material 1 and powder of a conductivity assisting agent 2 are mixed and thermally pressed and molded into a predetermined thickness of electrode.

As the polymer active material 1 of the cell electrode exhibiting an oxidation-reduction reaction according to the present embodiment, there can be exemplified polyaniline, polypyrol, polythiophen, polyacetylene, polyvinyl carbazole, polytriphenylamine, polypyridine, polyopyrlmidine, polyquinoxaline, polyphenylquinoxaline, polyisothianaphten, polypyridinezeal, polythienylene, polyparapffinylene, polyfluran, polyacen, polyfuran, polyazulene, polyindol, polydiaminoantraquinon, and the like.

Moreover, as the conductivity assisting agent 2, there can be exemplified acetylene black, Ketjen black, epitaxial carbon, graphite powder, aniline black, activated carbon powder and other conductive carbon powder, polyacrylonitirile, pitch, cellulose, phenol resin, or sintered carbon powder formed from palm shells, oxide powder of Ti, Sn, or In, metal powder such as stainless steel, Ni, Au, Ag, Ta, Nb, Cu, or Al. It should be noted these conductivity assisting agents may also be used in combination with the others.

Next, the cell electrode production method according to the first embodiment of the present invention will be detailed through Example 1 and Example 2.

EXAMPLE 1

The polymer activematerial exhibiting an electro-chemical oxidation-reduction reaction to be used as the electrode active material is polyindole expressed by Chemical Formula 1 (used for the positive electrode) and polyphenylquinoxaline expressed by Chemical Formula 2 (used for the negative electrode).

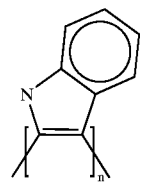

[Chemical Formula 1]

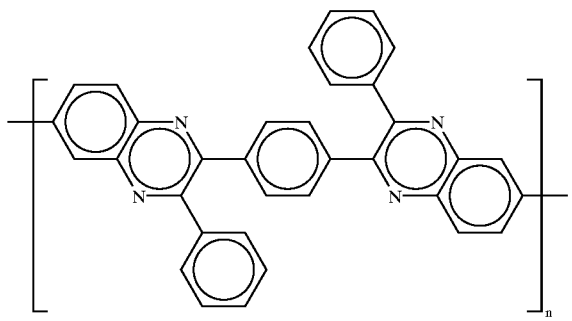

[Chemical Formula 2]

Firstly, polyindole and epitaxial carbon as the conductivity assisting agent were mixed with a mixing ratio of 90:10 by weight % and uniformly dispersed in an automatic mortar. The polyindole has an average particle diameter not greater than 10 micrometers and more preferably not greater than 5 micrometers, and the maximum particle diameter not greater than 100 micrometers and more preferably not greater than 30 micrometers.

Next, the dispersed powder mixture was put into a thermal press mold of stainless steel having an external size of 90×70 mm, an internal size of 70×50 mm, and depth of 10 mm, so that the powder is placed with a uniform thickness, and pressed with a pressure of 100 kg/cm² using a press plate having an external size of 70×50 mm. Thus, an electrode was molded. The molded electrode was subjected to a thermal treatment in the air at temperature of 25 degrees for 1 hour. Thus, it was possible to obtain a positive electrode having a uniform film thickness of 0.5 mm and density of 0.8 g/cm³.

Next, explanation will be given on the production method of the negative electrode. Polyphenylquinoxaline as the polymer active material exhibiting an electro-chemical oxidation-reduction reaction was mixed with an epitaxial carbon as the conductivity assisting agent with a mixing ratio of 90:10 by weight % and the mixture was uniformly dispersed in an automatic mortar. The polyphenylquinoxaline used here has an average particle diameter not greater than 10 micrometers and more preferably, not greater than 5 micrometers, and the maximum particle diameter not greater than 100 micrometers and more preferably not greater than 30 micrometers.

Next, in the same way as the positive electrode, the dispersed powder was put into a thermal press mold of stainless steel having an external size of 90×70 mm, internal size of 70×50 mm, and depth of 10 mm, so that the powder is placed with a uniform thickness and then pressed with a pressure of 100 kg/cm² using a press plate having an external size of 70×50 mm. The pressed electrode was subjected to a thermal treatment in the air at temperature of 250 degrees C. for 1 hour. It was possible to obtain a negative electrode having a uniform film thickness of 0.5 mm and density of 0.8 g/cm³.

Figure 2:
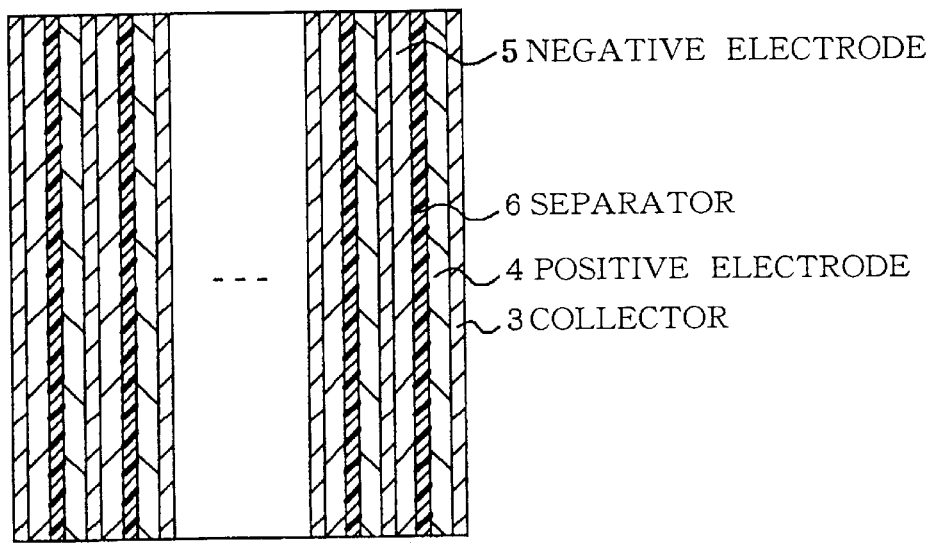
FIG. 2 is a cross sectional view of an example of a cell prepared by using an electrode produced by the cell electrode production method according to the first embodiment of the present invention.

Next, the positive and negative electrodes obtained are subjected to vacuum impregnation in 40 weight % of sulfuric acid aqueous solution. The positive and the negative electrodes arranged to oppose to each other via a separator (trade name: CELL GUARD) having a thickness of 25 micrometers were layered on a collector made from a conductive rubber having a thickness of 100 micrometers. Thus, a polymer cell was obtained. FIG. 2 shows a configuration of the polymer cell thus obtained. In the figure, symbol 3 denotes the collector, 4, the positive electrode, 5, the negative electrode, and 6, a porous separator for electrically separating the positive electrode from the negative electrode.

The polymer cell was charged up to 1.2 V with a constant current 10 mA/cm$^2$ and then discharged with a constant current of 10 mA/cm$^2$ down to the capacitance of 0.8 V. The cell was evaluated by defining 20 mm for the electrode film thickness sum of the positive electrode and the negative electrode. Table 1 shows the results. It should be noted that Table 1 shows capacitance after a 10-cycle test. The capacitance obtained was 2.3 Wh and 27 Wh/l per cell volume.

It should be noted that while this example has been explained by using 40 wt % of sulfuric acid aqueous solution as a cell electrolyte liquid and polyindole and polyphenylquinoxaline as high molecular materials, the present invention is not to be limited to this example.

EXAMPLE 2

In this example, the thickness of the positive electrode and the thickness of the negative electrode were increased to 10 mm. In this example, the number of layers of the collector was reduced, so as to increase the capacitance per cell volume.

Firstly, a positive electrode and a negative electrode were prepared by using polyindole and polyphenylquinoxaline like in Example 1. The powder amount was adjusted so that the electrode after thermal press had a film thickness of 10 mm. Thus, it was possible to obtain an electrode having a uniform film thickness of 10 mm and density of 0.8 g/cm$^3$.

Figure 3:
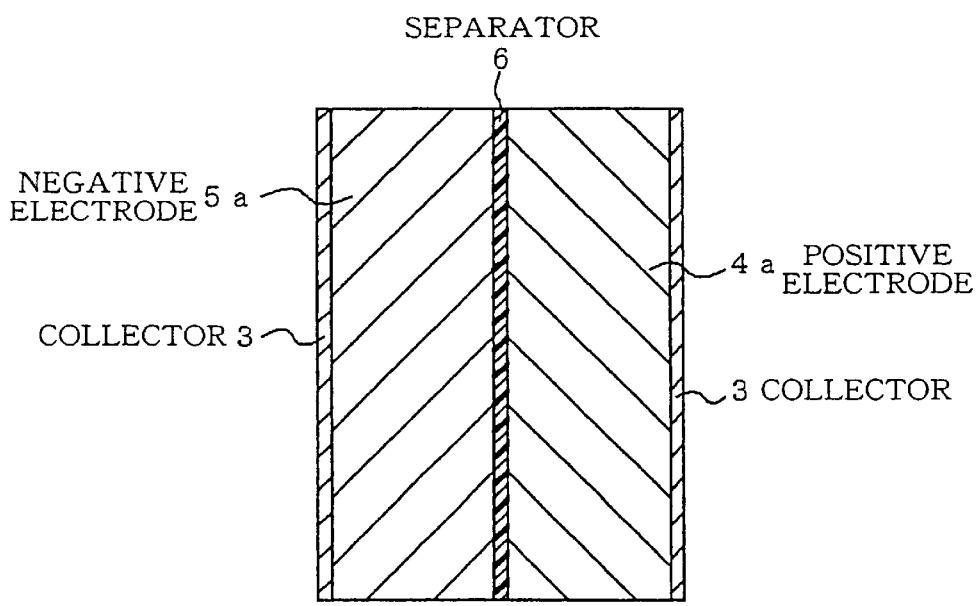
FIG. 3 is a cross sectional view of another example of a cell prepared by using an electrode produced by the cell electrode production method according to the first embodiment of the present invention.

A cell was prepared in the same was as in Example 1. FIG. 3 shows a configuration of the polymer cell. In the figure, symbol 4a denotes a positive electrode, 5a, a negative electrode, and like symbols as in FIG. 2 denote like members. The total film thickness of the cell electrodes is 20 mm. This cell was charged up to 1.2 V with a constant current of 10 mA/cm$^2$ and then discharged down to 0.8 V with a constant current of 10 mA/cm$^2$, so as to test the charge/discharge characteristics.

The test results are shown in Table 1. The capacitance obtained was 2.3 Wh and 32.1 Wh per cell volume. Thus, the capacitance was increased by 1.2 as compared to Example 1.

It should be noted that while the example has been explained by using 40 wt % of sulfuric acid aqueous solution as a cell electrolyte and polyindole and polyphenylquinoxaline as high molecular materials, the present invention is not to be limited to this example.

Figure 4:
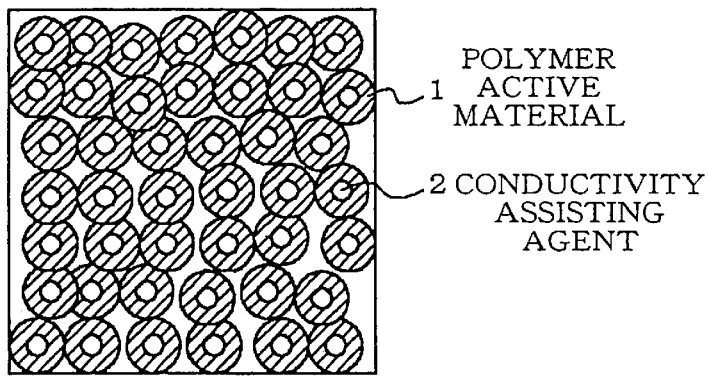
FIG. 4 is a cross sectional view of an essential portion of an electrode for explaining cell electrode production method according to a second embodiment of the present invention.

Description will now be directed to the cell electrode production method according to the second embodiment of the present invention with reference to FIG. 4. In this embodiment, the surface of the conductivity assisting agent 2 is covered by a polymer active material in advance and the powder thus obtained was molded by a thermal press.

The conductivity assisting agent in this Example may be the same powder as in the aforementioned Example 1.

Moreover, the conductivity assisting agent may be coated by a polymer active material as follows. The polymer active material powder and the conductivity assisting agent powder are mixed with a solvent in which a polymer activator is solved and then dried and re-crushed. Alternatively, the conductivity assisting agent powder is dispersed in a monomer solution for chemical polymerization of the polymer active material and the polymerized material is crushed into powder. Alternatively, the conductivity assisting agent powder is dispersed in a monomer solution for electrolytic polymerization of the polymer active material to form an electrolytic polymerized film containing the conductivity assisting agent and this film is peeled and crushed into powder.

In this Example, the high molecular material having an adverse adhesion capability is adhered to a conductive inorganic material, so that it can be thermally pressed at a low temperature. This has an effect to prevent lowering of electro-chemical activeness of the electrode high molecular material by the thermal oxidization.

Next, explanation will be given on the cell electrode production method of the second embodiment of the present invention through Examples 3 to 5.

EXAMPLE 3

Polyindole as the positive electrode active material was mixed with the epitaxial carbon as the conductivity assisting agent with a mixing ratio of 90:10 and the mixture was uniformly dispersed in an automatic mortar. The positive electrode powder dispersed was added by dimethylformamide (DMF) for swelling or solving and dispersed by a homoginizer at 15000 rpm for 15 minutes. After the dispersion, the mixture was dried in a vacuum drier under 10 Torr and 60 degrees C. After dried, the composite lump was crushed using an analytical mill at 20000 rpm for 3 minutes to obtain a powder.

The powder was put into a thermal press mold of stainless steel having an external size of 90×70 mm, internal size of 70×50 mm, and depth of 10 mm, so that the powder is placed with a uniform thickness. The powder was pressed using a press plate of external size of 70×50 mm with a pressure of 100 kg/cm$^2$. Next, the pressed electrode was subjected to a thermal treatment in the air at 200 degrees C. for 30 minutes to obtain a positive electrode. The electrode obtained had a film thickness of 10 mm and density of 0.9 g/cm$^3$.

Next, polyphenylquinoxaline as the negative electrode active material was mixed with the epitaxial carbon as the conductivity assisting agent with a mixing ratio of 90:10 and the mixture was uniformly dispersed in an automatic mortar. The dispersed negative electrode powder was added by methacresol for swelling or solving and dispersed by using a homogenizer at 15000 rpm for 15 minutes. After the dispersion, the mixture was dried using a vacuum drier under 10 Torr and 10 degrees C. After dried, the composite lump was crushed by an analytical mill at 20000 rpm for 3 minutes.

The crushed powder was the thermally pressed like the positive electrode to form a negative electrode having a uniform film thickness of 10 mm and density of 0.9 g/cc. The positive electrode and the negative electrode thus obtained were used to form a cell in the same way as Example 2.

The polymer cell thus completed was charged up to 1.2 V with a constant current of 10 mA/cm$^2$ and then discharged down to 0.8 V with a constant current of 10 mA/cm$^2$. The cell was evaluated by defining 20 mm for the total electrode film thickness of the positive electrode and the negative electrode. The evaluation results are shown in Table 1. The capacitance obtained was 2.8 Wh and 40.1 Wh/l per cell volume. Thus, the capacitance was increased by 1.5 as compared to Example 1.

It should be noted that this example has been explained by using 40 weight % sulfuric acid aqueous solution as the cell electrolyte liquid and polyindole and polyphenylquinoxaline as the high molecular materials, but the present invention is not to be limited to this example.

EXAMPLE 4

In this example, the thermal press of Example 3 was performed in an inert gas atmosphere. In this example, by performing the thermal press in the inert gas atmosphere, it was possible to suppress the oxidization reaction of the high molecular material (polymer active material) and suppress lowering of electro-chemical activeness of the high molecular material. It should be noted that the method if thermal pressing in an inert gas atmosphere can also be applied to the cell electrode production method of the aforementioned Example 1.

The positive electrode and the negative electrode were prepared in the same way as Example 3 and the thermal press was performed in a nitrogen gas atmosphere. The cell was produced in the same way as Example 3. It was possible to obtain an electrode having a uniform film thickness of 10 mm and density of 0.9 g/cm$^3$. By using the electrodes, a cell was prepared in the same way as Example 2.

The polymer cell obtained was charged up to 1.2 V with a constant current of 10 mA/cm$^2$ and then discharged down to 0.8 V with a constant current of 10 mA/cm$^2$ to test charge/discharge characteristics. The test results are shown in Table 1. It was possible to obtain a capacitance of 3.1 Wh and 44.1 Wh/l per cell volume. The capacitance was increased by 1.6 as compared to Example 1.

It should be noted that this example used 40 weight % sulfuric acid aqueous solution as the cell electrolyte liquid and polyindole and polyphenylquinoxaline as the high molecular materials. However, the present invention is not to be limited to this example.

EXAMPLE 5

In this example, the thermal press of Example 4 was performed under an increased pressure. In this example, by increasing the pressure of the thermal press, it was possible to improve the electrode density and increase the energy density.

The positive electrode and the negative electrode were prepared in the same way as Example 4 and the thermal press was performed under a pressure of 200 kg/cm$^2$. It was possible to obtain an electrode having a uniform film thickness of 10 mm and density of 1.1 g/cm$^3$. By using the electrodes, a cell was prepared in the same way as Example 2.

The polymer cell obtained was charged up to 1.2 V with a constant current of 10 mA/cm$^2$ and then discharged down to 0.8 V with a constant current of 10 mA/cm$^2$ to test charge/discharge characteristics. The test results are shown in Table 1. It was possible to obtain a capacitance greater than that of Example 3 and Example 4 and doubled as compared to Example 1:3.8 Wh and 54 Wh/l per cell volume.

It should be noted that this example used 40 weight % sulfuric acid aqueous solution as the cell electrolyte liquid and polyindole and polyphenylquinoxaline as the high molecular materials. However, the present invention is not to be limited to this example.

In the aforementioned embodiments of the present invention, the conductivity assisting agent 2 used was a conductive carbon powder such as acetylene black, Ketjen. black, epitaxial carbon, graphite powder, aniline black, or activated carbon; polyacrylonitrile, pitch, cellulose, phenol resin, or sintered carbon powder obtained from palm shells; oxide fine powder containing Ti, Sn, or In; stainless steel, Ni, Au, Ag, Ta, Nb, Cu, Al, or other metal powder. The conductivity assisting agent may also be a metal foil, metal mesh, or metal fiber. In case of the metal foil, the polymer active material powder is adhered onto the metal foil by a thermal press, so that the metal foil serves also as a collector. Moreover, when the metal mesh or metal fiber is used, like the case of metal foil, it is possible to form an electrode by adhering the polymer active material powder onto the surface of the metal mesh or metal fiber by the thermal press.

Next, explanation will be given on comparative examples 1 to 4 as conventional techniques.

COMPARATIVE EXAMPLE 11

Figure 5:
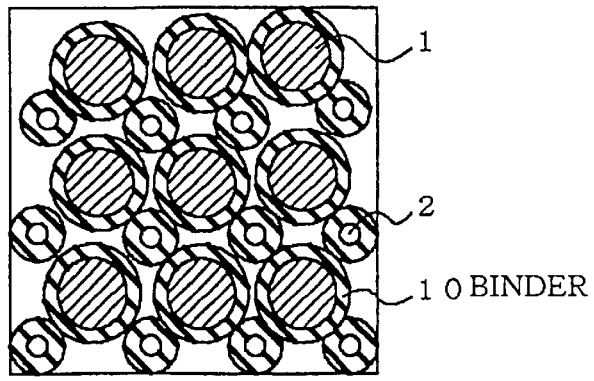
FIG. 5 is a cross sectional view of an essential portion of an electrode for explaining a conventional cell electrode production method.
Figure 6:
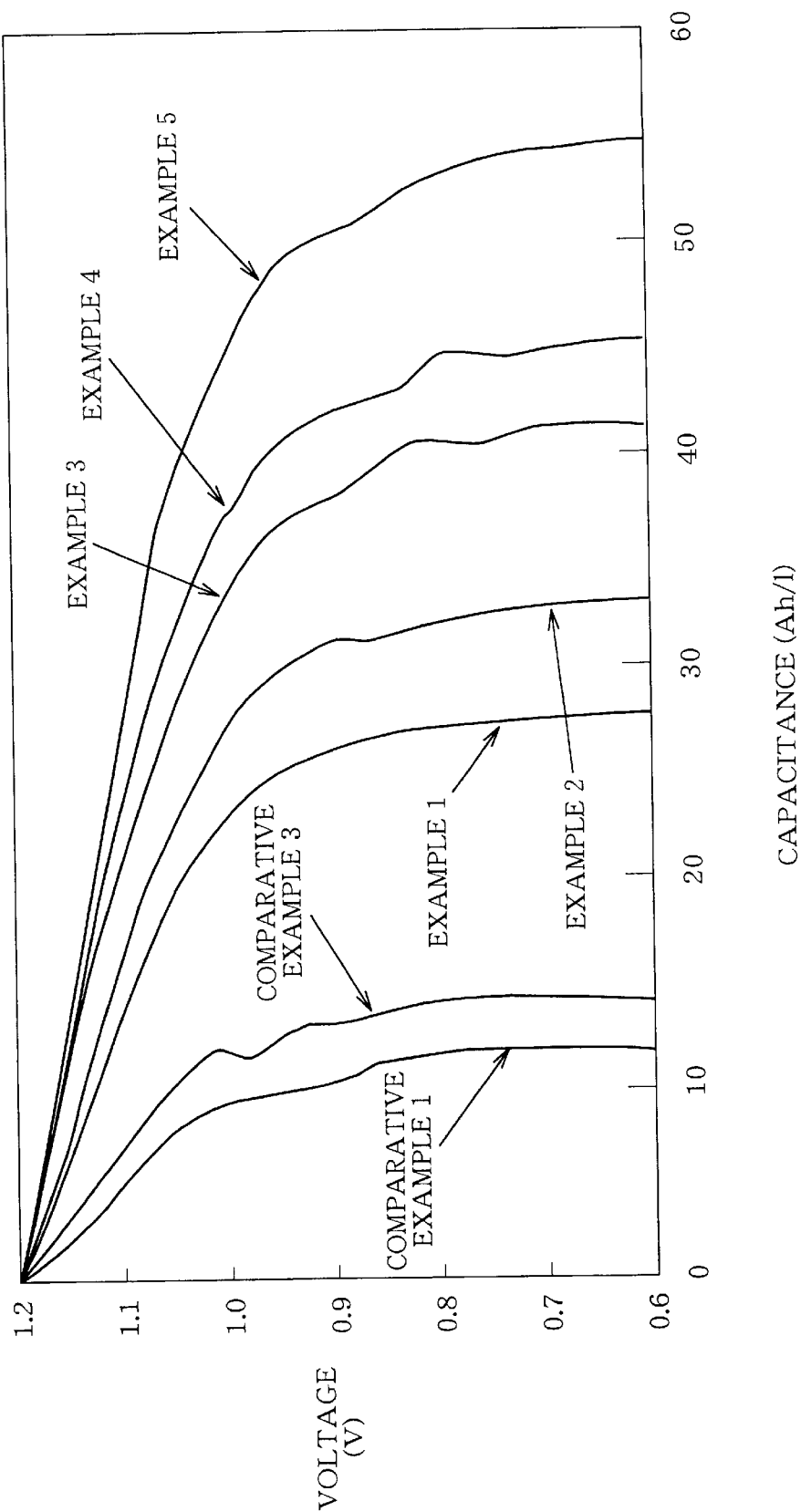
FIG. 6 graphically shows the voltage-capacity characteristic curves obtained during a constant current discharging by the polymer cell using the electrode produced according to the present invention and the polymer cell using the conventional electrode.

FIG. 5 is a cross sectional view of cell electrode of a conventional technique. In the figure, symbol 1 denotes a polymer active material, 2, a conductivity assisting agent, and 10, binder. The electrode has a configuration in which the polymer active material 1 is connected via the binder to the conductivity assisting agent 2.

Polyindole as the positive electrode active material, epitaxial carbon as the conductivity assisting agent, and polyvinylidene fluoride as the binder resin (average molecular weight: 1000) were mixed with a mixing ratio of 85:10:5 by weight % and added by N-methylpyrrolidone to obtain a slurry. The mixture in the slurry state was dispersed by using a homoginizer at 15000 rpm for 15 minutes.

The slurry was applied to a conductive rubber collector sheet using a doctor blade to form a film. The film was adjusted to be 500 micrometers after dried. The collector having the film was cut into a predetermined shape to obtain a positive electrode.

Polyphenylquinoxaline as the negative electrode active material, epitaxial carbon as the conductivity assisting agent, and polyvinylidene fluoride as the binder resin (average molecular weight: 1000) were mixed with a mixing ratio of 85:10:5 by weight % and added by methacresole to obtain a slurry, which was dispersed using a homoginizer at 15000 rpm for 15 minutes.

This slurry was applied onto a conductive rubber collector sheet using a doctor blade so as to form a film. The film was adjusted so as to be 500 micrometers after dried. The collector rubber having the film was cut into a predetermined shaped to obtain a negative electrode.

The positive electrode and the negative electrode thus obtained had a film thickness of 0.5 mm and density of 0.35 g/cm$^3$, which was less than half of the values of Example 1. Moreover, the electrode had a center portion lower than the end portion. The cell was produced in the same way as Example 1.

The polymer cell thus completed was charged up to 1.2 V with a constant current of 10 mA/cm$^2$ and then discharged down to 0.8 V with a constant current of 10 mA/cm$^2$ to test the charge/discharge characteristics. The cell was evaluated by defining 20 mm for the total thickness of the electrode films of the positive electrode and the negative electrode.

The capacitance obtained was 0.9 Wh and 11.2 Wh/l per cell volume, which was less than half of Example 1.

COMPARATIVE EXAMPLE 2

In Comparative Example 2, the electrode film thickness of Comparative Example 1 was increased to 10 mm.

The positive electrode and the negative electrode were prepared in the same way as Comparative Example 1 and the film was formed so as to have a thickness of 10 mm. However, it was impossible to obtain an electrode having a thickness of 10 mm because of cracks and breakage in the positive electrode and the negative electrode, causing electrode peeling off.

COMPARATIVE EXAMPLE 3

In this example, the active material in the negative and the positive electrodes was solved for film formation.

Polyindole as the positive electrode active material and epitaxial carbon as the conductivity assisting agent were mixed with a mixing ratio of 90:10:5 by weight % and added by DMF to obtain a slurry. The mixture in the slurry state was dispersed by using a homogenizer at 15000 rpm for 15 minutes.

The slurry was applied to a conductive rubber collector sheet using a doctor blade to form a film. The film was adjusted to be 500 micrometers after dried. The collector having the film was cut into, a predetermined shape to obtain a positive electrode.

Polyquinoxaline as the negative electrode active material and epitaxial carbon as the conductivity assisting agent were mixed with a mixing ratio of 90:10 by weight % and added by methacresole to obtain a slurry, which was dispersed using a homogenizer at 15000 rpm for 15 minutes.

This slurry was applied onto a conductive rubber collector sheet using a doctor blade so as to form a film. The film was adjusted so as to be 500 micrometers after dried. The collector rubber having the film was cut into a predetermined shaped to obtain a negative electrode.

The positive electrode and the negative electrode thus obtained had a film thickness of 0.5 mm and density of 0.4 g/cm$^3$, which was half of the values of Example 1. Moreover, the electrode had a center portion lower than the end portion. The cell was produced in the same way as Example 1.

The polymer cell thus completed was charged up to 1.2 V with a constant current of 10 mA/cm$^2$ and then discharged down to 0.8 V with a constant current of 10 mA/cm$^2$ to test the charge/discharge characteristics. The cell was evaluated by defining 20 mm for the total thickness of the electrode films of the positive electrode and the negative electrode.

As shown in Table 1, the capacitance obtained was 1.1 Wh and 13.5 Wh/l per cell volume. Thus, the capacitance was slightly increased as compared dto Comparative Example 1 but smaller as compared to Examples 1 to 5.

COMPARATIVE EXAMPLE 4

Comparative example 4 was produced in the same way as Comparative example 3 except for that the electrode film thickness was 10 mm. The positive electrode and the negative electrode were prepared in the same way as Comparative example 3 but the film thickness was made 10 mm. However, cracks, breakage, and electrode peeling off were cased in the positive and the negative electrode and it was impossible to obtain an electrode of 10 mm thickness.

TABLE 1

|  | Electrode Film Thickness (mm) | Film Formation | Electrode Density (g/cm$^3$) | Electrode Capacitance (Wh/l) | Capacitance Per Electrode 10 mm Thickness |
|---|---|---|---|---|---|
| Example 1 | 0.5 | ○ | 0.8 | 32.4 | 27 |
| Example 2 | 10 | ○ | 0.8 | 32.4 | 32.1 |
| Example 3 | 10 | ○ | 0.9 | 40.5 | 40.1 |
| Example 4 | 10 | ○ | 0.9 | 44.6 | 44.1 |
| Example 5 | 10 | ○ | 1.1 | 54.5 | 54 |
| Comparative Example 1 | 0.5 | ○ | 0.35 | 13.4 | 11.2 |
| Comparative Example 2 | 10 | x | — | — | — |
| Comparative Example 3 | 0.5 | Δ | 0.4 | 16.2 | 13.5 |
| Comparative Example 4 | 10 | x | — | — | — |

1) Collector Film Thickness: 0.1 mm
2) Film Formation
○: No Crack or Pealing Off
Δ: Crack and Pealing Off
x: Film not Formed As has been described above, in the present invention, a mixture of a polymer active material powder exhibiting an oxidation-reduction reaction and a conductivity assisting powder, or a powder including a conductivity assisting material coated by polymer active material is thermally pressed and molded into a cell electrode, which has the following effects.

(1) The polymer active material is partially fused by heat and molded into an electrode. The polymer active material exhibits a small volume change when solidified, enabling to form a thick-film electrode having no cracks which may be caused during shrinkage at solidification of the electrode.

(2) The thermal press at electrode molding increases the electrode density and improve the energy density per electrode volume.

(3) A predetermined amount of powder is pressed by a flat press surface during an electrode molding. Accordingly, it is possible to easily produce a plenty of electrodes having a uniform film thickness.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-296.903 (Filed on Oct. 19$^{th}$, 1999) including specification, claims, drawings and summary are incorporated herein by reference in its entirety.

What is claimed is:

1. A polymer secondary cell electrode production method comprising steps of:

mixing a polymer active material powder exhibiting an electro-chemical oxidation-reduction reaction and a conductivity assisting agent powder; and molding the mixture by thermal press into a predetermined thickness wherein the temperature of the thermal press is not lower than the glass transition point or the melting temperature of the polymer active material.

2. A polymer secondary cell electrode production method comprising steps of:

coating a conductivity assisting agent with a polymer active material exhibiting a electro-chemical oxidation-reduction reaction into a coated powder; and molding the coated powder by a thermal press into a predetermined thickness wherein the temperature of the thermal press is not lower than the glass transition point or the melting temperature of the polymer active material.

3. A polymer secondary cell electrode production method as claimed in claim 1, wherein the polymer active material is selected from a group consisting of polyaniline, polypyrrole, polythiophene, polyacetylene, polyvinyl carbazole, polytriphenylamine, polypyridine, polypyrimidine, polyquinoxaline, polyphenylquinoxaline, polyisothinanaphthene, polypyridinezeal, polythienylene, polyparapheylene, polyfluorane, polyacene, polyfuran, polyazulene, polyindole, and polydiaminoanthraquinone.

4. A polymer secondary cell electrode production method as claimed in claim 2, wherein the polymer active material is selected from a group consisting of polyaniline, polyprrole, polythiophene, polyacetylene, polyvinyl carbazole, polytriphenylamine, polypyridine, polypyrimidine, polyquinoxaline, polyphenylquinoxaline, polyisothinanaphthene, polypyridinezeal, polythienylene, polyparapheylene, polyfluorane, polyacene, polyfuran, polyazulene, polyindole, and polydiaminoanthraquinone.

5. A polymer secondary cell electrode production method comprising steps of:

mixing a polymer active material powder exhibiting an electro-chemical oxidation-reduction reaction and a conductivity assisting agent powder; and molding the mixture by thermal press into a predetermined thickness, wherein the thermal press is performed in a nitrogen gas atmosphere.

6. A polymer secondary cell electrode production method comprising steps of:

coating a conductivity assisting agent with a polymer active material exhibiting an electro-chemical oxidation-reduction reaction into a coated powder, and molding the coated powder by a thermal press into a predetermined thickness, wherein the thermal press is performed in a nitrogen gas atmosphere.

7. A polymer secondary cell electrode production method comprising steps of:

mixing a polymer active material powder exhibiting an electro-chemical oxidation-reduction reaction and a conductivity assisting agent powder; and molding the mixture by thermal press into a predetermined thickness, wherein the step for coating the conductivity assisting agent with the polymer active material exhibiting an electro-chemical oxidation-reduction reaction includes steps of:

mixing the polymer active material powder and the conductivity assisting agent powder with a solvent swelling or solving the polymer active material for predetermined period of time;

drying in vacuum the mixture into a mixed solid lump of the polymer active material and the conductivity assisting material; and crushing the mixed solid lump into powder of a predetermined particle diameter, so as to obtain powder of the conductivity assisting agent coated with the polymer active material.

8. A polymer secondary cell electrode production method comprising steps of:

coating a conductivity assisting agent with a polymer active material exhibiting an electro-chemical oxidation-reduction reaction into a coated powder; and molding the coated powder by a thermal press into a predetermined thickness, wherein the step for coating the conductivity assisting agent with the polymer active material exhibiting an electro-chemical oxidation-reduction reaction includes steps of:

dispersing the conductivity assisting agent powder in a solution containing monomer capable of chemical polymerization or electrolytic polymerization of the polymer active material;

performing chemical polymerization or electrolytic polymerization of the monomer; and drying the polymerized monomer into powder of a predetermined particle diameter, so as to obtain powder of the conductivity assisting agent coated with the polymer active material.

9. A polymer secondary cell electrode production method comprising steps of:

mixing a polymer active material powder exhibiting an electro-chemical oxidation-reduction reaction and a conductivity assisting agent powder; and molding the mixture by thermal press into a predetermined thickness, wherein the conductivity assisting agent powder is one or more than one in combination selected from a group consisting of acetylene black, Ketjen black, epitaxial carbon, graphite powder, aniline black, activated carbon powder and other conductive carbon powder, polyacrylonitririle, pitch, cellulose, phenol resin, or sintered carbon powder formed from palm shells, oxide powder of Ti, Sn, or In, metal powder stainless steel powder, Ni powder, Au powder, Ag powder, Ta powder, Nb powder, Cu powder and Al powder.

10. A polymer secondary cell electrode production method as claimed in claim 2, wherein the conductivity assisting agent powder is one or more than one in combination selected from a group consisting of acetylene black, Ketjen black, epitaxial carbon, graphite powder, aniline black, activated carbon powder and other conductive carbon powder, polyacrylonitririle, pitch, cellulose, phenol resin, or sintered carbon powder formed from palm shells, oxide powder of Ti, Sn, or In, metal powder, stainless steel powder, Ni powder, Au powder, Ag powder, Ta powder, Nb powder, Cu powder and Al powder.

11. A polymer secondary cell electrode production method as claimed in claim 7, wherein the conductivity assisting agent powder is one or more than one in combination selected from a group consisting of acetylene black, Ketjen black, epitaxial carbon, graphite powder, aniline black, activated carbon powder and other conductive carbon powder, polyacrylonitririle, pitch, cellulose, phenol resin, or sintered carbon powder formed from palm shells, oxide powder of Ti, Sn, or In, metal powder of stainless steel, Ni, Au, Ag, Ta, Nb, Cu or Al.

12. A polymer secondary cell electrode production method as claimed in claim 8, wherein the conductivity assisting agent powder is one or more than one in combination selected from a group consisting of acetylene black, Ketjen black, epitaxial carbon, graphite powder, aniline black, activated carbon powder and other conductive carbon powder, polyacrylonitririle, pitch, cellulose, phenol resin, or sintered carbon powder formed from palm shells, oxide powder of Ti, Sn, or In, metal powder of stainless steel, Ni, Au, Ag, Ta, Nb, Cu or Al.

13. A polymer secondary cell electrode production method comprising a step of attaching by a thermal press a polymer active material powder exhibiting an electrochemical oxidation-reduction reaction onto a metal foil, a metal mesh, or metal fiber of a conductivity assisting agent, so as to be molded into a predetermined thickness, wherein the temperature of the thermal press is not lower than the glass transition point or the melting temperature of the polymer active material.

14. A The polymer secondary cell electrode production method as claimed in claim 13, wherein the metal foil, a metal mesh, or metal fiber is coated with a conductivity assisting agent.

15. A polymer secondary cell electrode production method as claimed in claim 13, wherein the metal foil, metal mesh or metal fiber is selected from a group consisting of stainless steel, Ni, Au, Ag, Ta, Nb, Cu, and Al.

16. A polymer secondary cell electrode production method as claimed in claim 14, wherein the metal foil, metal mesh or metal fiber is selected from a group consisting of stainless steel, Ni, Au, Ag, Ta, Nb, Cu, and Al.

* * * * *